US009956949B2

(12) United States Patent
Yoshida (10) Patent No.: US 9,956,949 B2
(45) Date of Patent: May 1, 2018

(54) HYDRAULIC CONTROL DEVICE FOR DRIVE POWER DISTRIBUTION DEVICE (71) Applicant: HONDA MOTOR CO., LTD., Tokyo (JP)

(72) Inventor: Yuma Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/551,481

(22) PCT Filed: Feb. 16, 2016

(86) PCT No.: PCT/JP2016/054426
§ 371 (c)(1),
(2) Date: Aug. 16, 2017

(87) PCT Pub. No.: WO2016/133082
PCT Pub. Date: Aug. 25, 2016

(65) Prior Publication Data
US 2018/0050679 A1 Feb. 22, 2018

(30) Foreign Application Priority Data

Feb. 17, 2015 (JP) .................................. 2015-028618

(51) Int. Cl.
B60W 10/14 (2012.01)
B60K 17/348 (2006.01)
(Continued)

(52) U.S. Cl.
CPC ........... *B60W 10/14* (2013.01); *B60K 17/348* (2013.01); *B60K 23/0808* (2013.01);
(Continued)

(58) Field of Classification Search
CPC ............. B60W 10/14; B60W 2720/30; B60W 2710/105; B60W 2520/40; B60K 17/348; F16D 48/02
See application file for complete search history.

(56) References Cited

U.S. PATENT DOCUMENTS 5,573,476 A * 11/1996 Minowa ................ B60W 10/06
477/109
5,608,626 A * 3/1997 Ibamoto ............... B60W 10/06
192/3.58
(Continued)

FOREIGN PATENT DOCUMENTS

JP 2001-206092 A 7/2001
JP 2004-19768 A 1/2004
(Continued)

OTHER PUBLICATIONS

Notice of Allowance dated Jul. 11, 2017, issued in counterpart Japanese Patent Application No. 2017-500683 w/English translation (6 pages).
(Continued)

Primary Examiner — Joseph M Rocca
Assistant Examiner — Michael R Stabley
(74) Attorney, Agent, or Firm — Westerman, Hattori, Daniels & Adrian, LLP (57) ABSTRACT A device is disclosed that performs highly accurate control in a low-torque region and improves the response of the hydraulic system, taking advantage of hydraulic sealed-type hydraulic control devices. The hydraulic sealed-type hydraulic control device includes: a first characteristic (sealed pressurization) obtained by closing an on-off valve and driving an oil pump; a second characteristic (sealed depressurization) obtained by disabling drive of the oil pump and opening the on-off valve; and a third characteristic (flow-rate control) obtained by opening the on-off valve and driving the oil pump. In a low-torque region, the device performs control according to the third characteristic. In a high-torque region, the device performs control according to the second characteristic. In the process of depressurization, the device performs control according to the second characteristic. Moreover, the device performs control to increase
(Continued)

commanded hydraulic pressure in immediate response to an accelerator's change amount larger than a predetermined value.

2 Claims, 5 Drawing Sheets

(51) Int. Cl.
  *B60K 23/08* (2006.01)
  *F16D 48/02* (2006.01)

(52) U.S. Cl.
  CPC ......... *F16D 48/02* (2013.01); *B60W 2520/40* (2013.01); *B60W 2710/105* (2013.01); *B60W 2720/30* (2013.01)

(56) References Cited

U.S. PATENT DOCUMENTS

| | | | |
|---|---|---|---|
| 7,556,586 B2* | 7/2009 | Nakagawa | F16D 48/02 475/121 |
| 8,346,451 B2* | 1/2013 | Otanez | F16D 48/02 192/85.63 |
| 8,489,304 B2* | 7/2013 | Noguchi | B60W 10/119 701/84 |
| 9,239,066 B2 | 1/2016 | Sugo et al. | |
| 9,322,380 B2* | 4/2016 | Doering | F02D 41/023 |
| 9,377,063 B2* | 6/2016 | Yoshino | F16D 48/066 |
| 2005/0150702 A1* | 7/2005 | Matsuzaki | B60K 6/52 180/197 |
| 2011/0035090 A1 | 2/2011 | Noguchi et al. | |
| 2016/0238093 A1* | 8/2016 | Yoshida | B60K 23/0808 |

FOREIGN PATENT DOCUMENTS

| | | |
|---|---|---|
| JP | 2011-31829 A | 2/2011 |
| JP | 2012-224290 A | 11/2012 |
| JP | 5607240 B2 | 10/2014 |

OTHER PUBLICATIONS

International Search Report dated May 24, 2016, issued in counterpart International Application No. PCT/JP2016/054426 (2 pages).

* cited by examiner

HYDRAULIC CONTROL DEVICE FOR DRIVE POWER DISTRIBUTION DEVICE

FIELD OF INVENTION

The present invention relates to a hydraulic control device which controls hydraulic pressure used to generate engagement pressure of a clutch included in a drive power distribution device of a four-wheel-drive vehicle. The drive power distribution device distributes drive power from an engine to main driving wheels and auxiliary driving wheels.

BACKGROUND ART

Some conventional four-wheel-drive vehicles include a drive power distribution device for distributing drive power generated by a drive source, such as an engine, to main driving wheels and auxiliary driving wheels. In this kind of four-wheel-drive vehicles, when the front wheels are main driving wheels while the rear wheels are auxiliary driving wheels, for example, the drive power generated at the drive source is transmitted to the front wheels through a front drive shaft and a front differential while being transmitted to the drive power distribution device including a multiple disc clutch through a propeller shaft. Hydraulic fluid is then supplied with a predetermined pressure from a hydraulic control device to the drive power distribution device to control the engagement pressure of the drive power distribution device. A predetermined proportion of the drive power from the drive source is thereby transmitted to the rear wheels.

Examples of the hydraulic control device configured to control the hydraulic pressure supplied to the multiple disc clutch of the drive power distribution device include hydraulic control devices shown in Patent Literatures 1 and 2. Each of the hydraulic control devices shown in Patent Literatures 1 and 2 includes an electric oil pump supplying hydraulic fluid to a hydraulic chamber that presses the multiple disc clutch. The electric oil pump and hydraulic chamber are connected with a hydraulic pressure supply path. The hydraulic control device controls the revolutions of the electric pump so that the discharge value of the electric pump is equal to the required hydraulic pressure for the hydraulic clutch. The hydraulic control device described in Patent Literature 2 controls motor drive of the electric pump so as to generate hydraulic pressure according to the distribution ratio of drive power. The hydraulic control devices of Patent Literatures 1 and 2 are configured to supply hydraulic pressure necessary for the hydraulic clutch by driving the electric pump. The electric hydraulic pump therefore needs to be always operated while the hydraulic clutch is engaged. Accordingly, it is difficult to guarantee the durability of the motor (brush wear) when the motor to drive the electric oil pump is a brushed motor.

In this light, Patent Literature 3 proposes a hydraulic pressure sealed-type hydraulic control device using a motor and a solenoid valve. In this hydraulic pressure sealed-type hydraulic control device, the hydraulic pressure path to supply hydraulic fluid from an oil pump driven by the motor to a piston chamber of a clutch for distributing drive power is provided with a hydraulic fluid sealing valve to seal hydraulic fluid and a solenoid valve (an on-off valve) to open and close the fluid path between the hydraulic fluid sealing valve and piston chamber. In order to pressurize the piston chamber, the hydraulic pressure sealed-type hydraulic control device closes the solenoid valve and drives the oil pump with the motor in a stepwise manner to perform control so that the pressure in the piston chamber becomes commanded hydraulic pressure. In order to depressurize the piston chamber, the hydraulic pressure sealed-type hydraulic control device disables drive of the oil pump and opens and closes the solenoid valve in a stepwise manner to perform control so that the pressure of the piston chamber become the commanded hydraulic pressure. In such a manner, the motor is driven only to pressurize the piston chamber and is not driven to depressurize the piston chamber. This can reduce the frequency of use of the motor, improving the durability.

CITATION LIST

Patent Literature

[Patent Literature 1] Japanese Patent Laid-open Publication No. 2004-19768
[Patent Literature 2] Japanese Patent Laid-open Publication No. 2001-206092
[Patent Literature 3] Japanese Patent Publication No. 5607240

However, as a problem specific to hydraulic systems like as illustrated in Patent Literature 3, there is a significant response delay of distributed torque from commanded torque that is intended to be actually produced. In some cases, including during motor travel of a hybrid vehicle or supercharge travel with a turbo-engine, actual driving torque is produced so quickly that calculation of estimation drive power by an electronic controller cannot follow the production of the actual driving torque. Especially in those cases, there is such an inconvenience that driving torque for the front wheels is produced in immediate response to accelerator operation while driving torque distributed to rear wheels is produced late due to control for drive power distribution and response delay of the hydraulic system.

SUMMARY OF INVENTION

The present invention was made in the light of the aforementioned points. An object of the invention is to provide highly accurate control in a low-torque region and provide control to improve the response of the hydraulic system while taking advantage of hydraulic pressure sealed-type hydraulic control devices.

The present invention is a hydraulic control device of a drive power distribution device of a four-wheel drive vehicle, the four-wheel drive vehicle including: a drive power transmission path to transmit drive power from a drive source to a main driving wheel and a auxiliary driving wheel; and a drive power distribution device provided between the drive source and auxiliary driving wheel in the drive power transmission path, the drive power distribution device being composed a frictional engagement element including: a plurality of friction materials stacked on top of each other, and a piston chamber generating hydraulic pressure against a piston configured to press the friction materials in the stacking direction to engage the friction materials, the hydraulic control device including: a hydraulic circuit including: an oil pump which is driven with a motor and supplies hydraulic fluid to the piston chamber; a hydraulic fluid sealing valve configured to seal the hydraulic fluid to an fluid path allowing communication between the oil pump and piston chamber, an on-off valve configured to open and close the fluid path between the hydraulic fluid sealing valve and piston chamber, and an accumulator configured to reserve the hydraulic pressure in the piston chamber, and a controller configured to control drive of the oil pump by the motor and opening and closing of the on-off valve to supply a desired hydraulic pressure to the piston chamber. Characteristics of the hydraulic pressure given to the piston chamber through the hydraulic circuit include; a first characteristic obtained by closing the on-off valve and driving the oil pump; a second characteristic obtained by disabling drive of the oil pump and opening the on-off valve; and a third characteristic obtained by opening the on-off valve and driving the oil pump. The controller calculates estimation drive power according to the torque of the drive source and a transmission ratio; calculates commanded torque for the drive power distribution device based on the calculated drive power and a vehicle travel state; calculates commanded hydraulic pressure for the piston chamber based on the commanded torque; in the process of supplying hydraulic pressure to the piston chamber in a region where the commanded torque is lower than a predetermined torque, performs control according to the third characteristic so that the pressure in the piston chamber becomes the commanded hydraulic pressure; in the process of pressurizing the piston chamber in a region higher than the predetermined torque, performs control according to the first characteristic so that the pressure in the piston chamber becomes the commanded hydraulic pressure; in the subsequent process of depressurizing the piston chamber, performs control according to the second characteristic so that the pressure in the piston chamber becomes the commanded hydraulic pressure; performs control to increase the commanded hydraulic pressure in immediate response to an amount of accelerator's change greater than a predetermined value; and performs control to temporarily close the on-off valve when the commanded torque changes by a predetermined threshold or more during control according to the third characteristic.

The hydraulic control device according to the present invention employs the sealed-type hydraulic circuit as described above, and drive of the oil pump by the motor is stopped after the pressure in the piston chamber is increased to the commanded hydraulic pressure. Accordingly, the hydraulic pressure of the hydraulic fluid sealed in the fluid path can keep constant the fastening force of the clutch until the piston chamber starts to be depressurized. This allows the motor for driving the oil pump to intermittently operate while the engagement pressure of the clutch is being produced. The frequency of use of the motor is therefore reduced, thus improving the durability. On the other hand, to supply hydraulic pressure to the piston chamber in a region where the commanded torque is lower than a predetermined torque (that is, a predetermined low torque region), the hydraulic control device controls the hydraulic pressure according to the third characteristic, which is obtained by opening the on-off valve and driving the oil pump, so that the pressure of the piston chamber becomes the commanded hydraulic pressure (by opening the on-off valve, the hydraulic control is non-sealed control, that is, flow-rate control by the motor). This enables fine hydraulic control, providing highly accurate four-wheel-drive mode in the low torque transmission region for the auxiliary driving wheel.

A drive power distribution device using a hydraulic system calculates an estimation drive power based on the torque of the drive source (engine) and the transmission ratio. Based on the estimation drive power and vehicle travel state, the drive power distribution device then calculates commanded torque for the drive power distribution device and then based on the commanded torque, calculates the commanded hydraulic pressure for the piston chamber of the friction engagement element. The aforementioned basic configuration is employed also in the present invention. This allows drive power distribution depending on the drive power and vehicle travel state, thus implementing drive power distribution that provides good merchantability for turning performance and the like. On the other hand, as described above, there is a problem of response delay of the hydraulic system in the drive power distribution device. In this light, according to the present invention, control is performed to increase the commanded hydraulic pressure in immediate response to a change in accelerator operation greater than a predetermined value. When user's operation requiring quick response is performed, such as pressing the accelerator pedal hard, the commanded hydraulic pressure is increased to improve the control for drive power distribution to rear wheels and the response of the hydraulic system.

Moreover, when there is a rapid change in the vehicle travel state such as a quick turn, for example, it is generally difficult to distribute drive power in immediate response to such a rapid change due to the problem of response delay of the hydraulic system of the drive power distribution device. However, according to the present invention, when commanded torque changes by a predetermined threshold or more by a rapid change during the control according to the third characteristic, the on-off valve is temporarily closed. The hydraulic circuit becomes the hydraulic pressure scaled state immediately, and the drive power distributed to the rear wheel is increased immediately, thus improving the response of the hydraulic system for drive power distribution to the rear wheels.

In an embodiment, after temporarily closing the on-off valve during the control according to the third characteristic, the controller may perform control to open the on-off valve if the commanded torque does not reach the predetermined torque at the time when the actual hydraulic pressure in the piston chamber reaches the commanded hydraulic pressure corresponding to the commanded torque. When quick following is no longer necessary, the control is returned to non-sealed control according to the third characteristic. It is therefore possible to continue highly accurate four-wheel-drive mode in the low-torque transmission region for the auxiliary driving wheels.

MODES FOR CARRYING OUT THE INVENTION

Figure 1:
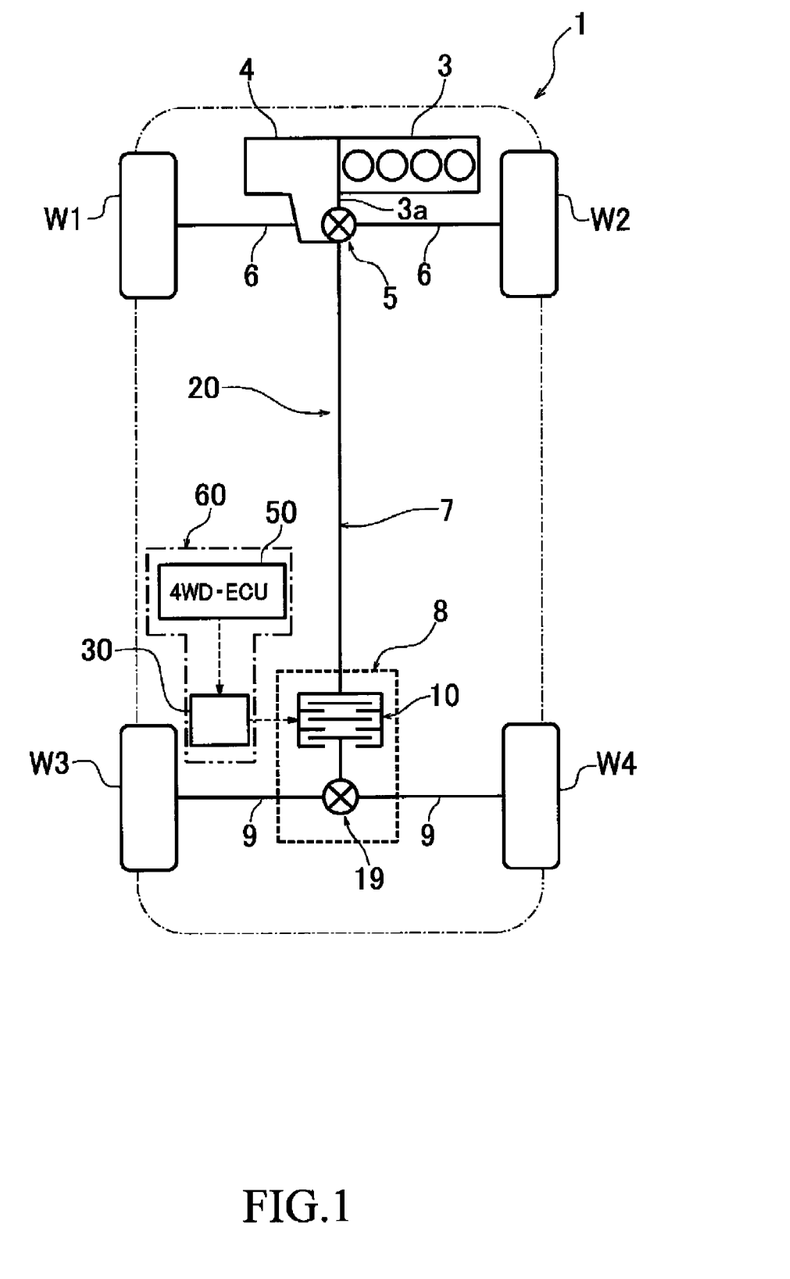
FIG. 1 is a diagram illustrating a schematic configuration of a four-wheel-drive vehicle including a hydraulic control device for a drive power distribution device according to an embodiment of the invention.

FIG. 1 is a diagram illustrating a schematic configuration of a four-wheel-drive vehicle including a hydraulic control device for a drive power distribution device according to an embodiment of the invention. A four-wheel-drive vehicle 1 illustrated in FIG. 1 includes: an engine (a drive source) 3 placed transversely in the front of the vehicle; an automatic transmission 4 integrally installed with the engine 3; and a drive power transmission path 20 configured to transmit drive power from the engine 3 to front wheels W1 and W1 and rear wheels W3 and W4.

The output shaft (not illustrated) of the engine 3 is coupled to the left and right front wheels W1 and W2 as main driving wheels through a front differential (hereinafter, referred to as a "front diff") 5 and left and right front drive shafts 6 and 6. The output shaft of the engine 3 is further coupled to the left and right rear wheels W3 and W4 as auxiliary driving wheels through the automatic transmission 4, the front diff 5, the propeller shaft 7, a rear differential unit (hereinafter, referred to as a "rear diff unit") 8, and left and right rear drive shafts 9 and 9.

The rear diff unit 8 includes: a rear differential (hereinafter, referred to as a "rear diff") 19 to distribute drive power to the left and right rear drive shafts 9 and 9; and a front and rear torque distribution clutch 10 to connect and disconnect the drive power transmission path from the propeller shaft 7 to the rear diff 19. The front and rear torque distribution clutch 10 is a hydraulic clutch and is a drive power distribution device to control drive power to be distributed to the rear wheels W3 and W4 in the drive power transmission path 20. The four-wheel-drive vehicle 1 further includes: a hydraulic circuit 30 to supply hydraulic fluid to the front and rear torque distribution clutch 10; and a 4WD•ECU (hereinafter, just referred to as ECU) 50 as a controller to control the hydraulic pressure supplied by the hydraulic circuit 30. The ECU 50 is composed of a microcomputer and the like.

The ECU 50 controls the hydraulic pressure to be supplied by the hydraulic circuit 30 to control drive power distributed to the rear wheels W3 and W4 at the front and rear torque distribution clutch (hereinafter, just referred to as a clutch) 10. Drive control is performed with the front wheels W1 and W2 as the main driving wheels and the rear wheels W3 and W4 as the auxiliary driving wheels.

When the clutch 10 is released (disconnected), rotation of the propeller shaft 7 is not transmitted to the rear diff 19 side, and all the torque of the engine 3 is transmitted to the front wheels W1 and W2, so that the four-wheel-drive vehicle 1 is in the front-wheel drive (2WD) mode. On the other hand, when the clutch 10 is connected, rotation of the propeller shaft 7 is transmitted to the rear diff 19 side, and the torque of the engine 3 is distributed to both of the front wheels W1 and W2 and the rear wheels W3 and W4, so that the four-wheel-drive vehicle 1 is in the four-wheel-drive (4WD) mode. The ECU 50 calculates the drive power to be distributed to the rear wheels W3 and W4 and the supply of hydraulic fluid to the clutch 10 corresponding to the calculated drive power based on detection by various detectors (not illustrated) configured to detect vehicle's travel state. The ECU 50 then outputs a drive signal based on the calculation result to the clutch 10. The ECU 50 thus controls the fastening power of the clutch 10 to control the drive power to be distributed to the rear wheels W3 and W4.

Figure 2:
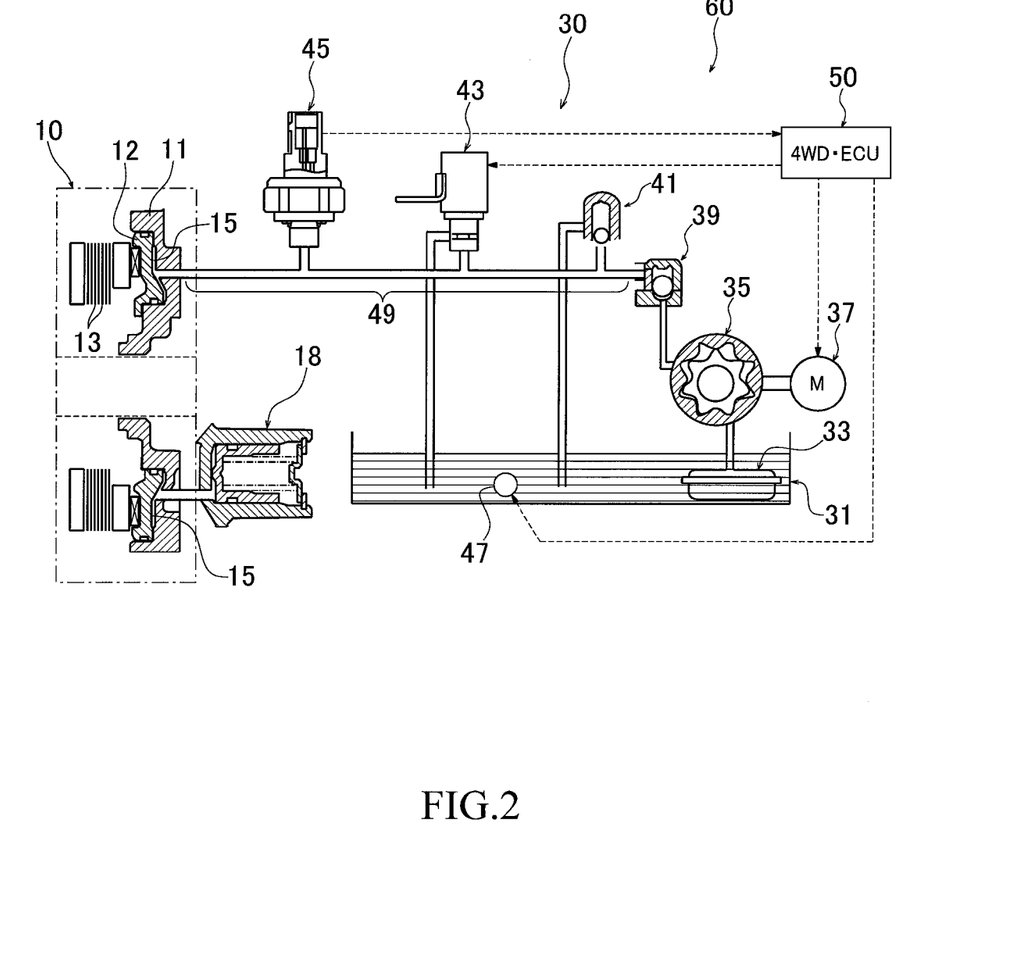
FIG. 2 is a diagram illustrating a hydraulic circuit example of the hydraulic control device according to the embodiment.

FIG. 2 is a hydraulic circuit diagram illustrating the detailed configuration of the hydraulic circuit 30. The hydraulic circuit 30 illustrated in FIG. 2 includes: an oil pump 35 which sucks hydraulic fluid reserved in the oil tank 31 through a strainer 33 and pressure-feeds the hydraulic fluid; a motor 37 which drives the oil pump 35; and an fluid path 40 which allows communication between the oil pump 35 and a piston chamber 15 of the clutch 10.

The clutch 10 includes a cylinder housing 11 and a piston 12. The piston 12 advances and retracts within the cylinder housing 11 to press plural friction materials 13 stacked on top of each other. In the cylinder housing 11, the piston chamber 15 is defined between the cylinder housing 11 and piston 12. The hydraulic fluid is introduced into the piston chamber 15. The piston 12 is placed facing an end of the plural friction materials 13 in the stacking direction. The piston 12 presses the friction materials 13 in the stacking direction by the pressure of the hydraulic fluid supplied to the piston chamber 15 to engage the clutch 10 with a predetermined engagement pressure.

In the fluid path 40, which allows communication between the oil pump 35 and piston chamber 15, a check valve 39, a relief valve 41, a solenoid valve (an on-off valve) 43, and a hydraulic pressure sensor 45 are provided in this order. The check valve 39 is configured so as to allow the hydraulic fluid to flow from the oil pump 35 side to the piston chamber 15 side but prevent the hydraulic fluid from flowing in the opposite direction. The hydraulic fluid fed to the downstream side of the check valve 39 by drive of the oil pump 35 can be therefore sealed in a fluid path (hereinafter, sometimes referred to as a sealed fluid path) 49 between the check valve 39 and piston chamber 15. The fluid path 49, which is provided with the above-described check valve 39 and oil pump 35, constitutes the sealed-type hydraulic circuit 30. In the embodiment, the check valve 39 is a hydraulic fluid sealing valve to seal the hydraulic fluid in the fluid path 49, which allows communication between the oil pump 35 and the piston chamber 15.

The relief valve 41 is a valve which is opened to release the pressure in the fluid path 49 when the pressure in the fluid path 49 between the check valve 39 and piston chamber 15 abnormally increases to beyond a predetermined threshold. The hydraulic fluid discharged from the relief valve 41 is returned to the oil tank 31. The solenoid valve 43 is an on-off valve which is PWM-controlled (duty-controlled) based on an instruction from the ECU 50 to control opening and closing of the fluid path 49. The hydraulic pressure in the piston chamber 15 is thereby controlled. The hydraulic fluid discharged from the fluid path 49 when the solenoid valve 43 is opened is returned to the oil tank 31. The hydraulic pressure sensor 45 is a hydraulic pressure detector to detect hydraulic pressure in the fluid path 49 and piston chamber 15. The detected values are transmitted to the ECU 50. The piston chamber 15 communicates with an accumulator 18. The accumulator 18 includes an effect of reducing rapid change and pulsation of hydraulic pressure in the piston chamber 15 and fluid path 49. Within the oil tank 31, an oil temperature sensor 47 is provided, which detects the temperature of the hydraulic fluid. The detected value of the oil temperature sensor 47 is transmitted to the ECU 50.

According to the embodiment, as the characteristics of hydraulic pressure given to the piston chamber 15 by the hydraulic circuit 30, first to third characteristics are prepared: the first characteristic is obtained by closing the solenoid valve (on-off valve) 43 and driving the oil pump 35; the second characteristic is obtained by disabling the drive of the oil pump 35 and opening the solenoid valve (on-off valve) 43; and the third characteristic is obtained by opening the solenoid valve (on-off valve) 43 and driving the oil pump 35. The first and second characteristics correspond to hydraulic pressure sealed control, and the third characteristic corresponds to flow rate control (non-sealed control). Which characteristic to use is determined according to control by the ECU (controller) 50.

The ECU (controller) 50 calculates estimation drive power based on the torque of the engine (drive source) 3 and the gear ratio of the automatic transmission 4. Based on the estimation drive power and vehicle travel state, the ECU 50 calculates a commanded torque for the front and rear torque distribution clutch (drive power distribution device) 10. Based on the commanded torque, the ECU 50 then calculates a commanded hydraulic pressure for the piston chamber 15 of the clutch 10. In the process of supplying hydraulic pressure to the piston chamber 15 in a region (a predetermined low-torque region) where the commanded torque is lower than a predetermined torque, the ECU (controller) 50 performs control according to the third characteristic so that the pressure of the piston chamber 15 become the commanded hydraulic pressure. In the third characteristic, since the solenoid valve (on-off valve) 43 is always opened, hydraulic pressure control for the piston chamber 15 is performed as the flow rate control (non-sealed control) by the motor 37. In the low-torque region, thus, the flow-rate control (non-sealed control) performed for the hydraulic pressure to be supplied to the piston chamber 15 enables highly accurate torque control for the clutch 10, thus implementing preferable four-wheel-drive control. Moreover, the commanded hydraulic pressure for the piston chamber 15 is determined according to the commanded torque based on the estimation drive power properly calculated and the drive power distribution properly calculated depending on the vehicle travel state. It is therefore possible to implement drive power distribution that provides good merchantability for turning performance and the like.

On the other hand, in the process of pressurizing the piston chamber 15 in the region where the commanded torque is higher than the predetermined torque, the ECU (controller) 50 performs control according to the first characteristic so that the pressure in the piston chamber 15 become the commanded hydraulic pressure corresponding to the commanded torque. In the first characteristic, the solenoid valve (on-off valve) 43 is always closed to seal the hydraulic fluid in the sealed fluid path 49. The hydraulic pressure control for the piston chamber 15 is performed as the hydraulic fluid sealed pressurization control by stepwise (intermittent) drive of the oil pump 35 (motor 37). After the piston chamber 15 is pressurized to the commanded hydraulic pressure according to the first characteristic, the hydraulic fluid sealed in the sealed fluid path 49 is maintained until the piston chamber 15 starts to be depressurized. This can keep constant the torque of the clutch 10 without driving the oil pump 35. In the subsequent process of depressurizing the piston chamber 15, the ECU 50 performs control according to the second characteristic so that the pressure in the piston chamber 15 become the commanded hydraulic pressure. In such a manner, the hydraulic pressure control for the piston chamber 15 is performed as the sealed control in a torque region higher than the aforementioned low torque region. This can reduce the frequency of use of the motor 37 for the oil pump 35, thus improving the durability.

Figure 3:
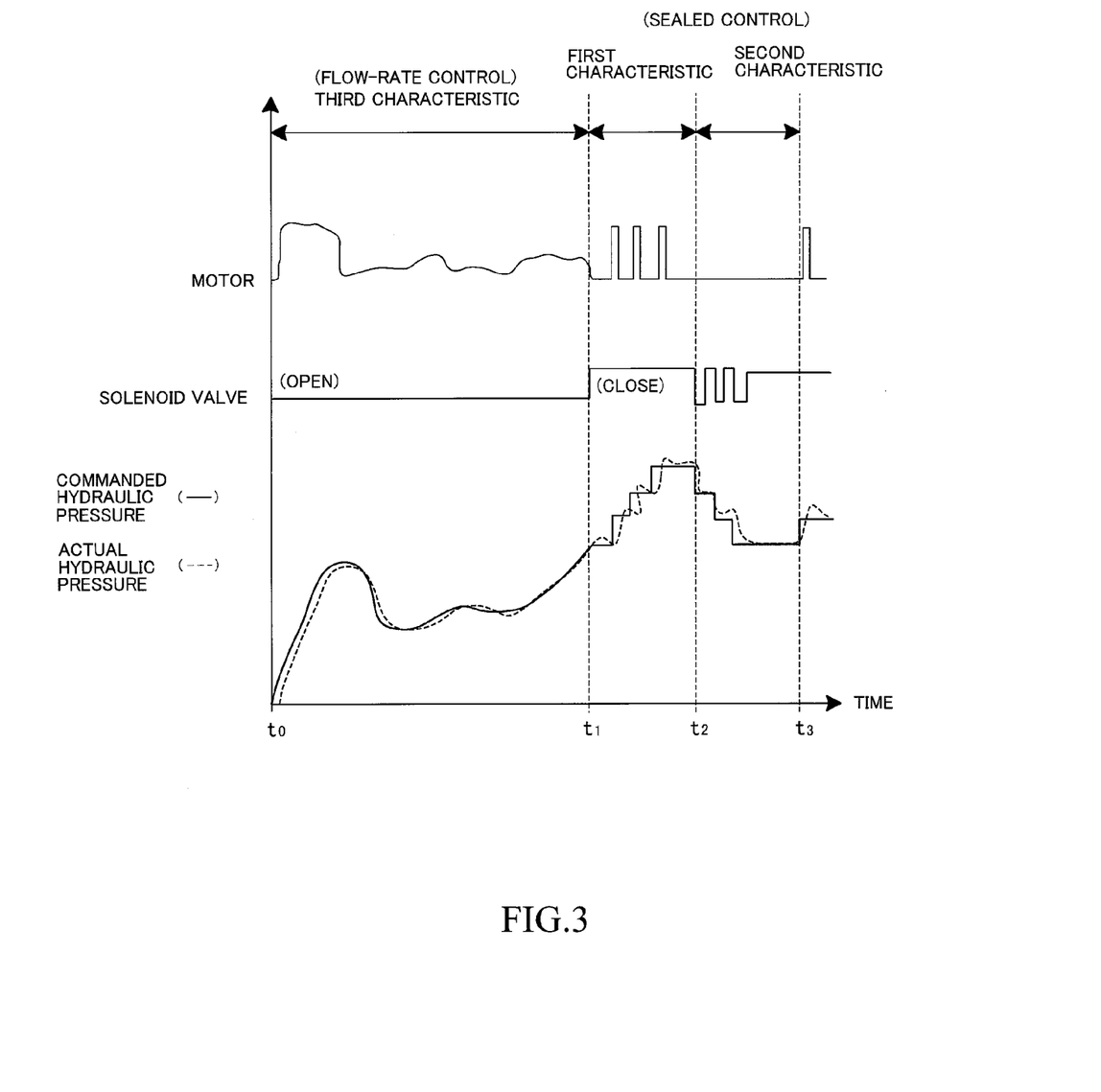
FIG. 3 is a time chart illustrating a switching example of hydraulic control characteristics according to the embodiment.

FIG. 3 is a time chart illustrating a switching example of the hydraulic pressure control characteristics according to the present invention which is performed based on the control by the ECU (controller) 50. In FIG. 3, the upper graph illustrates the instruction to drive the motor 37; the middle graph illustrates the open and close states of the solenoid valve (on-off valve) 43; and the lower graph illustrates the commanded hydraulic pressure (solid line) and actual hydraulic pressure (dashed line) in the piston chamber 15. Between time $t_0$ and $t_1$, hydraulic pressure control (flow-rate control) according to the third characteristic is performed. Between time $t_1$ and $t_2$, hydraulic pressure control (sealed pressurization control) according to the first characteristic is performed, and between time $t_2$ and $t_3$, hydraulic pressure control (sealed depressurization control) according to the second characteristic is performed. In other words, by the time $t_1$, the commanded torque for the clutch 10 to distribute drive power to the rear wheels is in a region not higher than the predetermined torque, and the hydraulic pressure control is performed according to the third characteristic. The commanded torque of the clutch 10 reaches the torque region higher than the predetermined torque at the time $t_1$, and the commanded hydraulic pressure corresponding thereto is specified. Moreover, the hydraulic pressure control characteristic is switched to the first characteristic (sealed pressurization control). At the time $t_2$, the commanded hydraulic pressure is reduced, and the hydraulic pressure control characteristic is thereby switched to the second characteristic (sealed depressurization control).

Figure 4:
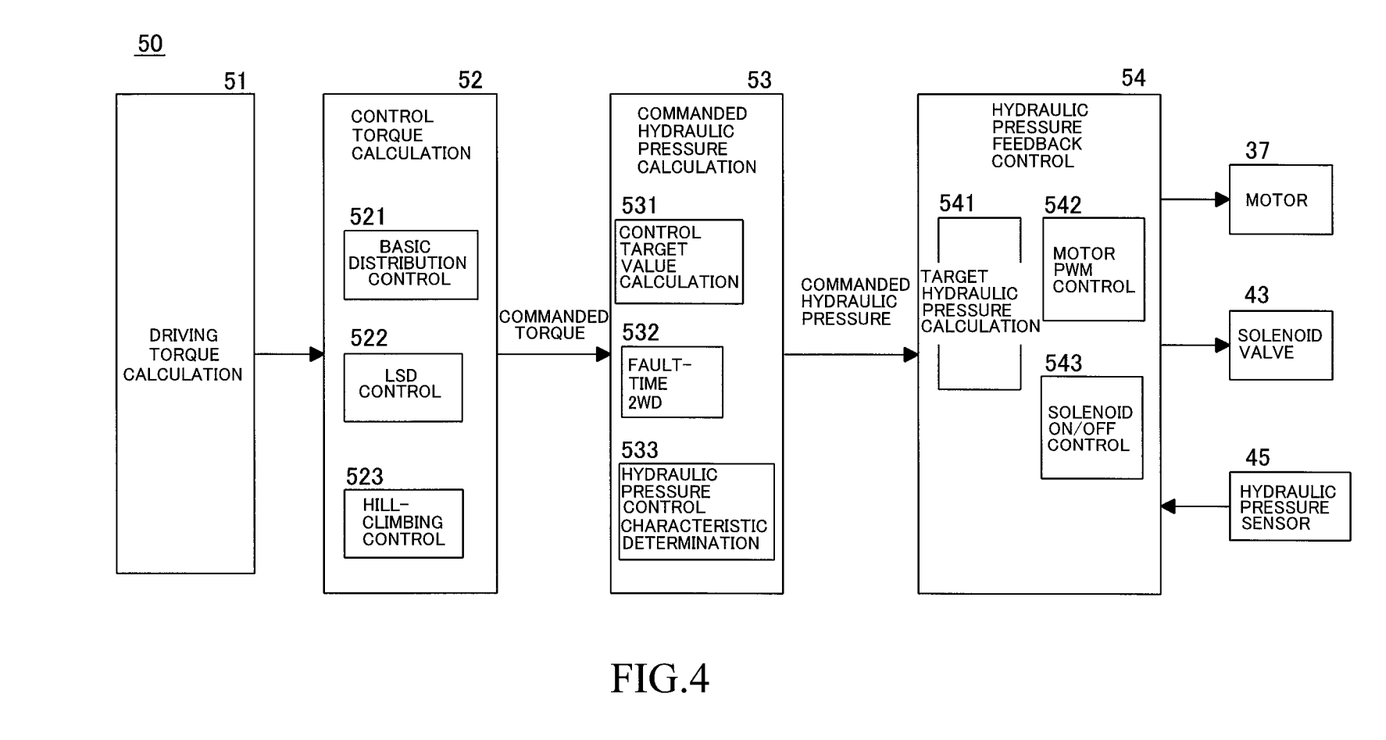
FIG. 4 is a diagram illustrating main functional blocks of a 4WD•ECU functioning as a hydraulic control device.

FIG. 4 illustrates main functional blocks of the 4WD•ECU (controller) 50. A driving torque calculation block 51 calculates driving torque (estimation drive power) required for the vehicle 1 depending on the travel conditions (the torque of the engine 3, the selected gear, the shift position, and the like) of the vehicle 1. A control torque calculation block 52 determines the distribution of driving torque distributed to the front and rear wheels depending on various control factors with a basic distribution control (basic distribution control for drive power to the front wheels W1 and W2 and rear wheels W3 and W4) block 521, an LSD control block 522, a hill-climbing control block 523, and the like and calculates the commanded torque for the front and rear torque distribution clutch (drive power distribution device) 10. A commanded hydraulic pressure calculation block 53 calculates commanded hydraulic pressure for the clutch 10 according to the commanded torque. Specifically, a control target value calculation block 531 calculates a control target value (that is, the commanded hydraulic pressure) for the clutch 10 based on the commanded torque, and a fault-time 2WD block 532 calculates a control target value (that is, the commanded hydraulic pressure) for switching to the 2WD mode in the event of a fault. In normal times, the control target value calculated by the control target value calculation block 531 is outputted as the commanded hydraulic pressure. In the event of a fault, the control target value calculated by the fault-time 2WD travel block 532 is outputted as the commanded hydraulic pressure. A hydraulic pressure feedback control block 54, through a target hydraulic pressure calculation block 541, calculates target hydraulic pressure (that is, hydraulic pressure deviation) for the clutch 10 based on the deviation between the commanded hydraulic pressure given by the commanded hydraulic pressure calculation block 53 and actual hydraulic pressure (feedback signal from the hydraulic pressure sensor 45) and controls the motor 37 or solenoid valve 43 based on the calculated target hydraulic pressure (that is, hydraulic pressure deviation) (a motor PWM control block 542 and a solenoid ON/OFF control block 543). The motor PWM control block 542 generates a PWM drive instruction signal for the motor 37 according to the target hydraulic pressure (that is, the hydraulic pressure deviation). As described later, the motor PWM control block 542 does not generate the PWM drive instruction signal for the motor 37 and disables drive of the motor 37 when an hydraulic pressure control characteristic indicating signal A indicates the second characteristic. As described later, the solenoid ON/OFF control block 543 generates an ON (close)/(OFF (open) indicating signal for the solenoid valve 43 based on the hydraulic pressure characteristic control signal A and the target hydraulic pressure (hydraulic pressure deviation).

Figure 5:
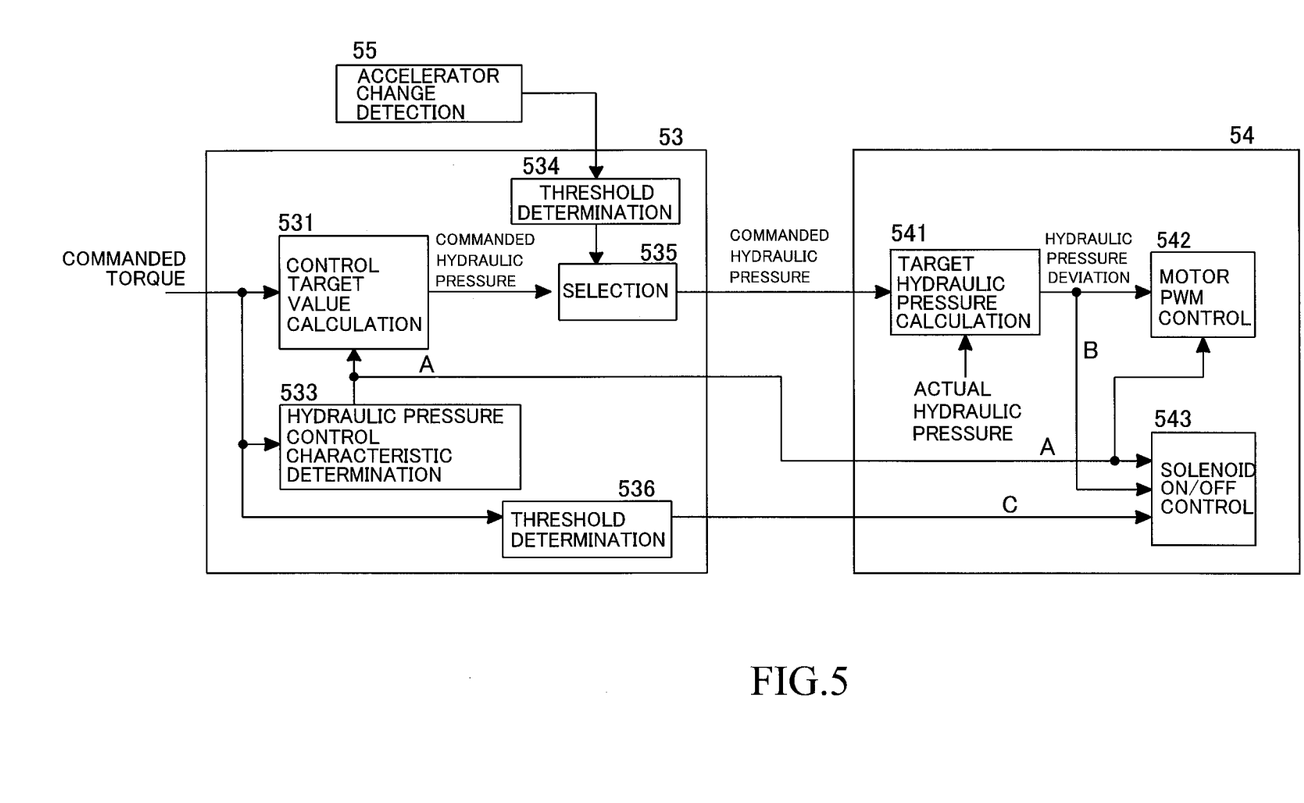
FIG. 5 is a diagram illustrating a control block relating to the invention.

FIG. 5 is a diagram illustrating control elements relating to the present invention which are included in the commanded hydraulic pressure calculation block 53 and hydraulic pressure feedback control block 54, which are illustrated in FIG. 4. The commanded hydraulic pressure calculation block 53 includes a hydraulic pressure control characteristic determination block 533. The hydraulic pressure control characteristic determination block 533 determines which hydraulic pressure control characteristic to use among the first to third characteristics according to the commanded torque (required torque) given from the control torque calculation block 52 and generates the hydraulic pressure control characteristic indicating signal A indicating the determined characteristic. As an example, the hydraulic pressure control characteristic determination block 533 generates the hydraulic pressure control characteristic indicating signal A indicating the third characteristic when the commanded torque is not higher than the predetermined torque; generates the hydraulic pressure control characteristic indicating signal A indicating the first characteristic during the period when the commanded torque is on a rising trend in the region higher than the predetermined torque; and then generates the hydraulic pressure control characteristic indicating signal A indicating the second characteristic when the trend of the commanded torque shifts to a falling trend. Herein, the predetermined value is properly determined on a design basis. In the commanded hydraulic pressure calculation block 53, the control target value calculation block 531 generates continuous or stepwise commanded hydraulic pressure as illustrated in the lower graph of FIG. 3 based on the commanded torque, depending on which hydraulic control characteristic to use for hydraulic pressure control according to the hydraulic pressure control characteristic indicating signal A. Specifically, to control the hydraulic pressure according to the third characteristic, the control target value calculation block 531 generates a commanded hydraulic pressure signal which continuously changes with continuous changes in the commanded torque. According to the third characteristic, the motor 37 is subjected to continuous flow-rate control, implementing highly accurate drive power distribution. To control the hydraulic pressure according to the first or second characteristic, the control target value calculation block 531 generates a commanded hydraulic pressure signal which changes in a stepwise manner with changes in the commanded torque. According to the first characteristic, therefore, the motor 37 is controlled in a stepwise manner, thus relatively reducing the frequency of use of the motor. According to the second characteristic, the solenoid valve 43 is subjected to stepwise ON (close)/OFF (open) control. The determination whether the commanded torque is on a rising trend or falling trend may be performed based on filtering of the commanded torque changing with time based on low-pass filter characteristics as an example.

The hydraulic pressure control characteristic indicating signal A is also used to control the motor PWM control block 542 and solenoid ON/OFF control block 543 of the hydraulic pressure feedback control block 54. Specifically, when the hydraulic pressure control characteristic indicating signal A indicates the second characteristic, the motor PWM control block 542 does not generate a PWM drive instruction signal for the motor 37 and disables drive of the motor 37. When the hydraulic pressure control characteristic indicating signal A indicates the third characteristic, the solenoid ON/OFF control block 543 generates an OFF (open) indicating signal for the solenoid valve 43 to open the solenoid valve 43, enabling motor flow-rate control following the third characteristic. When the hydraulic pressure control characteristic indicating signal A indicates the first characteristic, the solenoid ON/OFF control block 543 generates an ON (close) indicating signal for the solenoid valve 43 to close the solenoid valve 43, producing the hydraulic pressure sealed control state. Moreover, when the hydraulic pressure control characteristic indicating signal A indicates the second characteristic, the solenoid ON/OFF control block 543 generates an ON (close) indicating signal for the solenoid valve 43 to open the solenoid valve 43 on the condition that target hydraulic pressure (hydraulic pressure deviation) B is negative (the actual hydraulic pressure is higher than the commanded hydraulic pressure), allowing depressurization control under the hydraulic pressure sealed control (not using the motor 37).

In the process of supplying hydraulic pressure to the piston chamber 15 in the region where the commanded torque is not higher than the predetermined torque, control is performed according to the third characteristic so that the pressure in the piston chamber 15 become the commanded hydraulic pressure. In the process of pressurizing the piston chamber 15 in the region where the commanded torque is higher than the predetermine torque, control is performed according to the first characteristic so that the pressure in the piston chamber 15 become the commanded hydraulic pressure. In the process of depressurizing the piston chamber 15, then, control is performed according to the second characteristic so that the pressure in the piston chamber 15 become the commanded hydraulic pressure. The above-described controls are basic controls. In the present invention, the hydraulic pressure control further includes response compensation described below.

In FIG. 5, an accelerator change detection block 55 detects an amount of change of the accelerator pedal of the vehicle 1 (or an engine throttle). An accelerator change threshold determination block 534 determines whether the detected amount of change of the accelerator (the amount of an increase) is larger than a predetermined threshold value. When the detected amount of change is larger than the predetermined threshold, the accelerator change threshold determination block 534 outputs a predetermined value, and otherwise, the acceleration change threshold determination block 534 outputs 0. A selection block 535 is configured to select larger one of proper commanded hydraulic pressure (control target value) corresponding to the commanded torque which is calculated by the control target calculation block 531 and the output value from the threshold determination block 534. The selected value is given to the hydraulic pressure feedback control block 54 as the commanded hydraulic pressure signal. The predetermined value outputted from the accelerator change threshold determination block 534 is not a value indicating a very large commanded hydraulic pressure but a value large enough to compensate calculation delay of the control system. The predetermined value is a value which is larger than 0 and is properly determined on a design basis. When the vehicle 1 starts or accelerator changes relatively greatly during cruising drive and the like, because of the calculation delay, in a transient period when the control target value calculation block 531 has not yet calculated the commanded hydraulic pressure (control target value) corresponding to the accelerator's change, the predetermined value is outputted from the accelerator change threshold determination block 534 in immediate response to the accelerator's change, selected by the selection block 535, and given to the hydraulic pressure feedback control block 54 as the commanded hydraulic pressure signal. In such a manner, control is performed in immediate response to the accelerator's change larger than the predetermined value so as to increase the commanded hydraulic pressure. The motor 37 therefore rotates in some degree before the control target value calculation block 531 calculates proper commanded hydraulic pressure (control target value). This produces hydraulic pressure a little in the piston chamber 15, thus improving the response of distributing drive power to the rear wheels.

The aforementioned response compensation is effective especially in the case where calculation of the estimation drive power in the electronic controller cannot follow production of actual driving torque because the actual driving torque is produced very quickly, such as when a hybrid vehicle is traveling with a motor or a vehicle is traveling with a turbo engine supercharged. In such a case, driving torque is produced in the front wheels in immediate response to accelerator operation. According to the present invention, driving torque to be distributed to the rear wheels quickly follows the production of the driving torque in the front wheels. In this light, the accelerator change threshold determination block 534 may be configured to output a predetermined value for response compensation when predetermined travel conditions are satisfied, such as when the vehicle is in the motor travel mode or supercharging travel mode.

In FIG. 5, a commanded torque change threshold determination block 536 is configured to determine whether the amount of change in the commanded torque is not less than a predetermined threshold. The commanded torque change threshold determination block 536 calculates the amount of change in the commanded torque. When determining that the calculated amount of change in the commanded torque (the amount of the increase) is not less than the predetermined threshold, the commanded torque change threshold determination block 536 outputs an commanded torque rapid change determination signal C. When there is a rapid change in the vehicle travel state, such as a quick turn, for example, the commanded torque is increased in order to increase the rear-wheel driving torque for stable travel. In such a case, the commanded torque change threshold determination block 536 outputs a commanded torque rapid change determination signal C. The commanded torque rapid change determination signal C is used by the solenoid ON/OFF control block 543. As described above, when the hydraulic pressure characteristic control signal A indicates the third characteristic, the solenoid ON/OFF control block 543 generates an OFF (open) indicating signal for the solenoid valve 43 to open the solenoid valve 43 and thereby enable motor flow-rate control according to the third characteristic. When given the commanded torque rapid change determination signal C during the control according to the third characteristic, the solenoid ON/OFF control block 543 temporarily generates an ON (close) indicating signal for the solenoid valve 43. The solenoid valve 43 is thereby temporarily closed to increase the hydraulic pressure in the piston chamber 15.

Even when the commanded torque increases rapidly, delay of the hydraulic system makes it difficult for the hydraulic pressure generated by driving the motor 37 to immediately follow the commanded torque. However, according to the present invention, the solenoid valve 43 is temporarily closed to add an increase in hydraulic pressure, so that the actual hydraulic pressure can be immediately increased following the increase in the commanded hydraulic pressure. In such a manner, the solenoid valve 43 is temporarily closed when the change in the commanded torque is equal to or more than the predetermined threshold value. Accordingly, the hydraulic circuit becomes hydraulic pressure sealed state immediately, and the immediate increase in drive power distributed to the rear wheels can improve the response of the hydraulic system for drive power distribution to the rear wheels. As an example, the solenoid ON/OFF control block 543 can determine based on the hydraulic pressure deviation signal B whether the actual hydraulic pressure reaches the commanded hydraulic pressure and terminate the temporary closing control of the solenoid valve 43 during control according to the third characteristic. Specifically, the solenoid ON/OFF control block 543 turns OFF (opens) the solenoid valve 43 to return the control to the normal control according to the third characteristic. When rapid following is no longer necessary, the control is returned to non-sealed control according to the third characteristic. It is therefore possible to continue highly accurate four-wheel driving mode in the low-torque transmission region for the rear wheels (auxiliary driving wheels). In another example, the temporary closing control for the solenoid valve 43 during the control according to the third characteristic may be terminated by a timer.

In the aforementioned embodiment, the hydraulic fluid sealing valve which closes the fluid path 49 to switch from the period of increasing the pressure to the period of keeping the pressure is the check valve 39 but may be an on-off solenoid valve instead. In that case, the accumulator 18 may be omitted.

The invention claimed is:
1. A hydraulic control device of a drive power distribution device of a four-wheel drive vehicle, the four-wheel drive vehicle including:
 a drive power transmission path to transmit drive power from a drive source to a main driving wheel and a auxiliary driving wheel; and
 a drive power distribution device provided between the drive source and auxiliary driving wheel in the drive power transmission path, the drive power distribution device being composed a frictional engagement element including: a plurality of friction materials stacked on top of each other; and a piston chamber generating hydraulic pressure against a piston configured to press the friction materials in the stacking direction to engage the friction materials, the hydraulic control device comprising:
a hydraulic circuit including: an oil pump which is driven with a motor and supplies hydraulic fluid to the piston chamber; a hydraulic fluid sealing valve configured to seal the hydraulic fluid to an fluid path allowing communication between the oil pump and piston chamber, an on-off valve configured to open and close the fluid path between the hydraulic fluid sealing valve and piston chamber, and an accumulator configured to reserve the hydraulic pressure in the piston chamber; and
a controller configured to control drive of the oil pump by the motor and opening and closing of the on-off valve to supply a desired hydraulic pressure to the piston chamber, wherein
characteristics of the hydraulic pressure given to the piston chamber through the hydraulic circuit include; a first characteristic obtained by closing the on-off valve and driving the oil pump; a second characteristic obtained by disabling drive of the oil pump and opening the on-off valve; and a third characteristic obtained by opening the on-off valve and driving the oil pump, and
the controller
calculates estimation drive power according to the torque of the drive source and a transmission ratio;

calculates commanded torque for the drive power distribution device based on the calculated drive power and a vehicle travel state;

calculates commanded hydraulic pressure for the piston chamber based on the commanded torque;

in the process of supplying hydraulic pressure to the piston chamber in a region where the commanded torque is lower than a predetermined torque, performs control according to the third characteristic so that the pressure in the piston chamber becomes the commanded hydraulic pressure;

in the process of pressurizing the piston chamber in a region higher than the predetermined torque, performs control according to the first characteristic so that the pressure in the piston chamber becomes the commanded hydraulic pressure;

in the subsequent process of depressurizing the piston chamber, performs control according to the second characteristic so that the pressure in the piston chamber becomes the commanded hydraulic pressure;

performs control to increase the commanded hydraulic pressure in immediate response to an amount of accelerator's change greater than a predetermined value; and performs control to temporarily close the on-off valve when the commanded torque changes by a predetermined threshold or more during control according to the third characteristic.

2. The hydraulic control device of a drive power distribution device according to claim 1, wherein after temporarily closing the on-off valve during the control according to the third characteristic, the controller performs control to open the on-off valve if the commanded torque does not reach the predetermined torque at the time when actual hydraulic pressure in the piston chamber reaches the commanded hydraulic pressure corresponding to the commanded torque.

* * * * *